United States Patent [19]

Takeuchi

[11] Patent Number: 4,609,088
[45] Date of Patent: Sep. 2, 1986

[54] DRY CLUTCH DISC

[75] Inventor: Hiroshi Takeuchi, Higashiosaka, Japan

[73] Assignee: Kabushiki Kaisha Daikin Seisakusho, Osaka, Japan

[21] Appl. No.: 554,029

[22] Filed: Nov. 21, 1983

[30] Foreign Application Priority Data

Jun. 8, 1982 [JP] Japan .................. 57-185747

[51] Int. Cl.⁴ .................. F16D 3/12; F16D 13/64
[52] U.S. Cl. .................. 192/106.1; 192/30 V; 192/70.17; 464/84
[58] Field of Search .............. 192/30 V, 70.16, 70.17, 192/70.18, 106.1, 106.2; 464/62, 81, 84, 100, 101, 69

[56] References Cited

U.S. PATENT DOCUMENTS

| 1,959,213 | 5/1934 | Nygard | 464/84 X |
| 1,967,052 | 7/1934 | Dumm | 464/84 |
| 4,019,346 | 4/1977 | Fukuda | 464/69 X |
| 4,465,172 | 8/1984 | Gatewood | 192/70.17 |
| 4,467,905 | 8/1984 | Takeuchi | 192/106.2 |

FOREIGN PATENT DOCUMENTS 0113636 7/1983 Japan .................. 192/30 V

Primary Examiner—Willis R. Wolfe, Jr.
Attorney, Agent, or Firm—Armstrong, Nikaido, Marmelstein & Kubovcik

[57] ABSTRACT

A dry clutch disc wherein an outward cam extending radially outwardly is formed on an output-side spline hub, input-side side plates are disposed on both sides of the cam, a leaf spring facing on a cam surface and elastically radially outwardly deformable by means of the cam is equipped between the input-side side plates, and a stopper made of elastic material touchable on the leaf spring at the time of its radial outward deformation is provided on the side plates with a fixed distance kept apart from the leaf spring radially outwardly.

7 Claims, 5 Drawing Figures dry clutch disc

BACKGROUND OF THE INVENTION

This invention relates to a dry clutch disc for use in an automobile etc.

In a conventional dry clutch disc, a coil-spring-shaped torsion spring or a torsion rubber is used for the purpose of generating a twisting torque. For example, a coil spring is disposed in a window hole of a side plate so as to be compressed in the circumferential direction between a circumferential edge of the window hole and a notch in a flange of a spline hub. However, the dry clutch disc utilizing the coil spring has a complicated construction and is hard to be made into compact size. Further, it is difficult to obtain a sufficient twisting angle because a space for disposition of the coil spring is restricted.

An object of this invention is
(1) to considerably simplify the construction of the clutch disc,
(2) to make the clutch disc into compact size, and
(3) to make it possible to secure a large twisting angle, by utilizing a leaf spring and a cam etc.

In order to accomplish the above object, in this invention, an outward cam extending radially outwardly is formed on an output-side spline hub, input-side side plates are disposed on both sides of the cam, a leaf spring facing on a cam surface and elastically radially outwardly deformable by means of the cam is equipped between the input-side side plates, and a stopper made of elastic material touchable on the leaf spring at the time of its radial outward deformation is provided on the side plates with a fixed distance kept apart from the leaf spring radially outwardly.

DETAILED DESCRIPTION OF THE INVENTION

Figure 2:
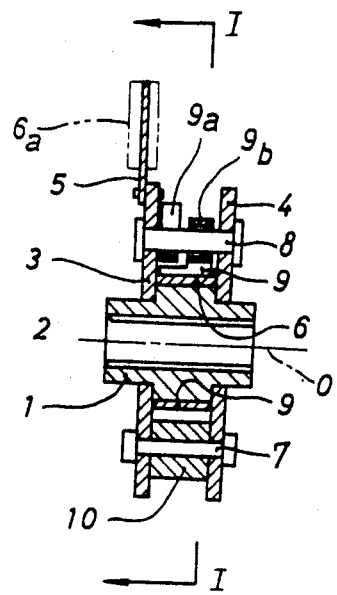
FIG. 2 is a sectional view taken on the line II—II of FIG. 1.
Figure 1:
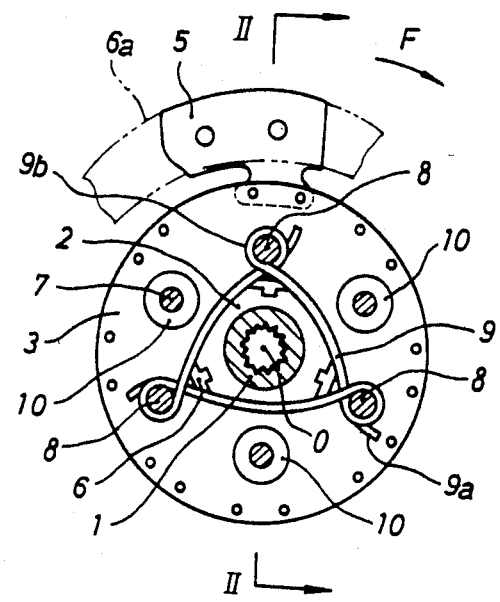
FIG. 1 is a vertical sectional front view of the clutch disc according to this invention taken on the line I—I of FIG. 2.

In FIG. 1 and FIG. 2, an approximately triangular outward cam 2 extending radially outwardly is formed on an output-side spline hub 1, and tip members 6 having a small coefficient of friction and made of plastic, for example, are fixed to three apexes of the cam 2. A radial outward side face of the tip member 6 is joined smoothly to an outer peripheral surface of the cam 2 each other to form a part of cam surface. Each cam surface portion between the tip members 6 is curved respectively so as to form a radially outwardly slight convex shape.

On both axial sides (FIG. 2) of the cam 2, input-side first and second side plates 3, 4 are disposed to be fitted onto an outer peripheral surface of the hub 1. The both plates 3, 4 are interconnected by means of three stop pins 7 and three leaf spring support pins 8, each of them being parallel with a center axis 0. A plurality (only one is illustrated) of cushioning plates 5 is fixed to an outer peripheral edge of the first side plate 3 along its circumference and an input facing 6a is fixed to both sides of the cushioning plate 5. The input facing 6a is disposed, for example, in between a flywheel and a pressure plate.

Each support pin 8 is so disposed as to be spaced equally in the circumferential direction and at the same time to face to each tip member 6 from radial outside with a small distance kept therebetween. A leaf spring 9, which contacts with the cam surface and extends approximately in the circumferential direction along the cam surface, is disposed in between support pins 8 respectively. A front end 9a of each leaf spring 9 at the F side in clutch rotating direction is formed into a free end and mates with the support pin 8 in such a manner as sliding freely. A rear end 9b of each leaf spring 9 at the side opposite to the arrow F is wound around the support pin 8. Incidentally, a half of the front end 9a of the leaf spring is notched away at the side of the second side plate 4, and a half of the rear end 9b of the leaf spring is notched away at the side of the first side plate 3, as shown in FIG. 2. Namely, it is so devised that the rear end 9b and the front end 9a of the two leaf springs 9 can be fitted to the one support pin 8 without deviating axial positions of each leaf spring 9.

Each stop pin 7 is disposed on each bisector of support pins 8 respectively, and each cylindrical rubber stopper 10 is fitted onto each stop pin 7 respectively. A center-axis-0-side end portion of the rubber stopper 10 faces to the leaf spring 9 from radial outside keeping a fixed distance therebetween.

Now, the function of the clutch disc will be described hereunder. When the facing 6a is engaged with a flywheel etc., the side plates 3, 4 begin to rotate in the direction of the arrow F, and at the same time the hub 1 also begins to rotate through the leaf spring 9 and the cam 2.

As rotating torque of the side plates 3, 4 increases, the side plates 3, 4 begin to be twisted in the direction of the arrow F relatively to the hub 1 and the leaf spring 9 begins to be elastically deformed in the outward radial direction by the action of the cam 2 (tip member 6). Namely, the side plates 3, 4 begin to be twisted in the direction of the arrow F relatively to the hub 1 against an elastic force of the leaf spring 9.

Figure 3:
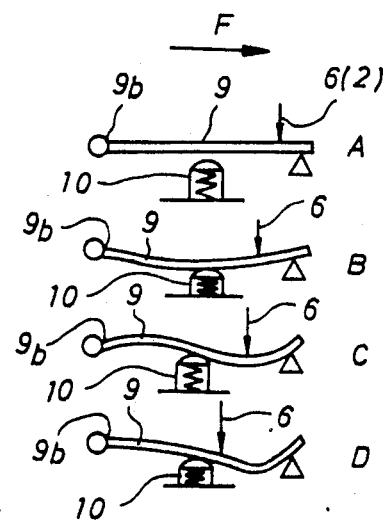
FIG. 3 is a schematic drawing for explaining function of the clutch disc.

FIG. 3 shows relations of the leaf spring 9, the cam 2 (tip member 6) and the rubber stopper 10 in schematic views, wherein the twisting angle becomes larger as the twisting stage progresses from the upper A to the lower B, C, and D sequentially. Therefore, as the twisting angle becomes larger starting from the stage A of FIG. 3 (the stage shown in FIG. 1), the contacting point of the tip member 6a with the leaf spring 9 moves toward the side of the rear end 9b of the leaf spring, and the leaf spring 9 contacts with the rubber stopper 10 after the tip end has moved some distance as illustrated in FIG. 3B. Only the leaf spring 9 functions in a range between FIG. 3A and FIG. 3B, so that a twisting rigidity (inclination of diagram) is small as illustrated by a section AB of FIG. 4.

Further, when starting from the stage of FIG. 3B the tip member 6 moves toward the side of the rear end 9b of the leaf spring, also the rubber stopper 10 begins to be elastically deformed together with the leaf spring 9, thus the stage of FIG. 3C is reached. FIG. 3C shows the stage where, with the rubber stopper 10 functioning as an intermediate supporting point, a front half of the leaf spring 9 is pushed forward to the side of the rubber stopper 10 (in the outward radial direction of FIG. 1) and a rear half of the leaf spring 9 pulled back to the side opposite to the rubber stopper 10 (center axis 0 side of FIG. 1). Elastic forces of both the leaf spring 9 and the rubber stopper 10 function at a stage between FIG. 3B and FIG. 3C, so that the twisting rigidity in this section becomes larger than that of the section AB as shown in FIG. 4.

Figure 4:
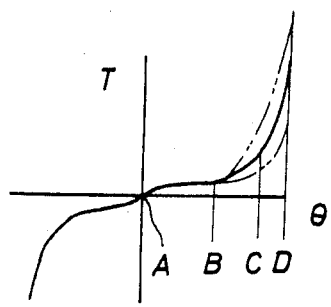
FIG. 4 is a torsional characteristic diagram.

When starting from the stage of FIG. 3C the tip member further moves toward the rear end side, the twisting rigidity becomes steeply larger as shown by the section CD of FIG. 4 because it can be supposed that a distance between supporting points of the leaf spring with which the tip member contacts becomes a half of FIG. 3B and because the tip member 6 comes near to the vicinity of the rubber stopper.

When the rubber stopper 10 has been compressed to its maximum limit as shown by FIG. D, the twisting action is completed.

Incidentally, the twisting rigidity is determined by a thickness of the leaf spring 9 and a rigidity of the rubber stopper.

In FIG. 4, the abscissa $\theta$ represents the twisting angle and the ordinate T represents the rotating torque respectively.

Hysteresis is extremely small in the section AB of FIG. 4 from the reason that the hysteresis is generated only by a friction between the tip member 6 and the leaf spring 9 both having small coefficient of friction.

In the section BC of FIG. 4, a friction between the leaf spring 9 and the rubber stopper 10 begins to function in addition to the friction between the tip member 6 and the leaf spring 9. Moreover, a compression force and a compression area between the leaf spring 9 and the rubber stopper 10 increase as the twisting angle increases, and a friction force increases with an increase in the compression force and compression area. Consequently, the hysteresis becomes gradually higher.

In the section CD of FIG. 4, a high hysteresis is obtainable because the friction between the leaf spring 9 and the rubber stopper 10 becomes remarkably large.

Incidentally, the approximately rectangular cam 2 having the three apexes (tip members 6) is provided in FIG. 1, but an elliptic cam having two apexes may be provided therein. Further, the tip member 6 may be formed integrally with the cam 2 and the hub 1 using material having a smooth surface such as carbon fiber.

Figure 5:
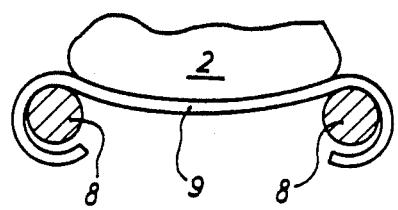
FIG. 5 is a partially sectional front view showing the deformation of the leaf spring.

Both ends of the leaf spring 9 may be formed into hookshape and bridged across the support pins 8 as illustrated in FIG. 5.

As described above, the outward cam 2 extending radially outwardly is formed on the output-side spline hub 1, the input-side side plates 3, 4 are disposed on both sides of the cam 2, the leaf spring 9 facing on the cam surface and elastically radially outwardly deformable by means of the cam 2 is equipped between the input-side side plates 3, 4, and the rubber stopper (stopper made of elastic material) 10 touchable on the leaf spring 9 at the time of its radial outward deformation is provided on the side plates with a fixed distance kept apart from the leaf spring 9 radially outwardly. Therefore, this invention has the following advantages:

(1) The design is simplified and the clutch disc can be made into compact size owing to the construction in which the twisting torque is generated by means of the cam 2, the leaf spring 9 and the rubber stopper 10.

(2) A large twisting angle can be easily obtained even within a restricted space since the elastic deformation of the leaf spring 9 caused by the cam 2 is utilized. Further, the change in the twisting characteristic becomes smooth as shown by the stages B and C of FIG. 4 because the twisting characteristic changes with the contacting condition of rubber stopper 10 and the leaf spring 9.

(3) The friction force for generating the hysteresis changes, with an increase in the rotating torque, from the friction force generated only between the leaf spring 9 and the cam 2 to the friction force including that generated between the leaf spring 9 and the rubber stopper 10 in addition to the above. Therefore, a low hysteresis can be obtained at a small rotating torque and a high hysteresis can be obtained at a large rotating torque, so that this clutch disc is optimum for the automobile purpose.

Incidentally, the leaf spring 9 faces on the cam surface under previously contacting condition in FIG. 1, however, a construction may also be employed wherein the leaf spring 9 faces on the cam surface with a short distance kept therebetween in the outward radial direction.

Further, the leaf spring of the present invention is not necessarily limited to a literal leaf spring made of such as a band plate, but may be composed of plural wire rods formed into leaf spring shape.

Moreover, this invention is also applicable to a damper disc.

What is claimed is:

1. A dry clutch disc comprising a radially outwardly extending outward cam formed on an output-side spline hub, input-side side plates disposed on both sides of the cam, a leaf spring facing on a cam surface and elastically radially outwardly deformable by means of the cam being equipped between the input-side side plates, and a stopper means made of elastic material adjacent the leaf spring for elastically stopping outward radial travel of the leaf spring at the time of its radial outward deformation, said stopper means being provided on the side plates with a fixed distance kept apart from the leaf spring radially outwardly.

2. A dry clutch disc as set forth in claim 1, in which a tip member having a small coefficient of friction is provided on an apex of the cam.

3. A dry clutch disc as set forth in anyone of claim 1 or claim 2, in which a rubber stopper is used for the stopper means made of elastic material.

4. A dry clutch disc as set forth in anyone of claim 1 or claim 2, in which plural leaf spring support pins are provided on the side plates with equal spaces kept therebetween in a circumferential direction of said side plates, a clutch-rotating-directional front end of each leaf spring mates freely slidingly with one support pin as a free end thereof, and a rear end of the leaf spring is wound around an adjacent support pin as a fixed end.

5. A dry clutch disc as set forth in claim 4, in which said stopper means made of elastic material is disposed on a bisector between support pins.

6. A dry clutch disc as set forth in anyone of claim 1 or claim 2, in which plural leaf spring support pins are provided on the side plates with equal spaces kept therebetween in a circumferential direction of said side plates, and both ends of the leaf spring are formed into hooked shape to be bridged across the support pins.

7. A dry clutch disc as set forth in claim 6, in which said stopper means made of elastic material is disposed on a bisector of support pins.

* * * * *